(12) United States Patent
Chamberlin et al.

(10) Patent No.: US 8,513,840 B2
(45) Date of Patent: Aug. 20, 2013

(54) ELECTRIC MACHINE COOLING SYSTEM AND METHOD

(75) Inventors: Bradley D. Chamberlin, Pendleton, IN (US); James Ramey, Fortville, IN (US)

(73) Assignee: Remy Technologies, LLC, Pendleton, IN (US)

( * ) Notice: Subject to any disclaimer, the term of this patent is extended or adjusted under 35 U.S.C. 154(b) by 289 days.

(21) Appl. No.: 13/101,049

(22) Filed: May 4, 2011

(65) Prior Publication Data

US 2011/0273039 A1  Nov. 10, 2011

Related U.S. Application Data

(60) Provisional application No. 61/331,221, filed on May 4, 2010.

(51) Int. Cl.
*H02K 9/00* (2006.01)
(52) U.S. Cl.
USPC ............................... 310/59; 310/52
(58) Field of Classification Search
USPC ................................. 310/52–59, 89
See application file for complete search history.

(56) References Cited

U.S. PATENT DOCUMENTS

| | | | |
|---|---|---|---|
| 2,080,678 A | 5/1937 | Van Horn et al. | |
| 2,264,616 A | 12/1941 | Buckbee | |
| 3,447,002 A | 5/1969 | Ronnevig | |
| 3,525,001 A | 8/1970 | Erickson | |
| 3,601,884 A * | 8/1971 | Kemeny | 228/160 |
| 3,748,507 A | 7/1973 | Sieber | |
| 4,038,570 A | 7/1977 | Durley, III | |
| 4,818,906 A * | 4/1989 | Kitamura et al. | 310/58 |
| 5,081,382 A | 1/1992 | Collings et al. | |
| 5,180,004 A | 1/1993 | Nguyen | |
| 5,207,121 A | 5/1993 | Bien | |
| 5,220,233 A * | 6/1993 | Birch et al. | 310/156.28 |
| 5,271,248 A * | 12/1993 | Crowe | 62/505 |
| 5,293,089 A | 3/1994 | Frister | |
| 5,372,213 A | 12/1994 | Hasebe et al. | |
| 5,519,269 A | 5/1996 | Lindberg | |

(Continued)

FOREIGN PATENT DOCUMENTS

| | | |
|---|---|---|
| JP | 05-292704 A | 11/1993 |
| JP | 06-036364 U | 5/1994 |

(Continued)

OTHER PUBLICATIONS

International Search Report.

(Continued)

*Primary Examiner* — Thanh Lam
(74) *Attorney, Agent, or Firm* — Greenberg Traurig LLP

(57) ABSTRACT

Embodiments of the invention provide an electric machine module including a module housing, which can at least partially define a machine cavity. In some embodiments, an electric machine can include a stator assembly and a rotor assembly and can be positioned in the machine cavity. In some embodiments, the module housing can include a coolant transport network, which can include at least one passage in fluid communication with at least one first annulus and at least one second annulus. In some embodiments, the first annulus can be substantially axially adjacent to an axial end of the stator assembly and the second annulus can be substantially axially adjacent to an axial end of the rotor assembly. In some embodiments, the annuli can include a plurality of annulus apertures.

20 Claims, 8 Drawing Sheets

(56) References Cited

U.S. PATENT DOCUMENTS

| | | | |
|---|---|---|---|
| 5,616,973 A | 4/1997 | Khazanov | |
| 5,859,482 A | 1/1999 | Crowell et al. | |
| 5,923,108 A | 7/1999 | Matake et al. | |
| 5,937,817 A | 8/1999 | Schanz et al. | |
| 5,965,965 A | 10/1999 | Umeda et al. | |
| 6,011,332 A | 1/2000 | Umeda et al. | |
| 6,069,424 A | 5/2000 | Colello et al. | |
| 6,075,304 A | 6/2000 | Nakatsuka | |
| 6,087,746 A | 7/2000 | Couvert | |
| 6,095,754 A | 8/2000 | Ono | |
| 6,097,130 A | 8/2000 | Umeda et al. | |
| 6,114,784 A | 9/2000 | Nakano | |
| 6,133,659 A * | 10/2000 | Rao | 310/89 |
| 6,147,430 A | 11/2000 | Kusase et al. | |
| 6,147,432 A | 11/2000 | Kusase et al. | |
| 6,173,758 B1 | 1/2001 | Ward et al. | |
| 6,181,043 B1 | 1/2001 | Kusase et al. | |
| 6,201,321 B1 | 3/2001 | Mosciatti | |
| 6,208,060 B1 | 3/2001 | Kusase et al. | |
| 6,232,687 B1 | 5/2001 | Hollenbeck et al. | |
| 6,242,836 B1 | 6/2001 | Ishida et al. | |
| 6,291,918 B1 | 9/2001 | Umeda et al. | |
| 6,300,693 B1 | 10/2001 | Poag et al. | |
| 6,313,559 B1 | 11/2001 | Kusase et al. | |
| 6,333,573 B1 | 12/2001 | Nakamura | |
| 6,335,583 B1 | 1/2002 | Kusase et al. | |
| 6,346,758 B1 | 2/2002 | Nakamura | |
| 6,359,232 B1 | 3/2002 | Markovitz et al. | |
| 6,404,628 B1 | 6/2002 | Nagashima et al. | |
| 6,417,592 B2 | 7/2002 | Nakamura et al. | |
| 6,459,177 B1 | 10/2002 | Nakamura et al. | |
| 6,509,665 B1 | 1/2003 | Nishiyama et al. | |
| 6,515,392 B2 | 2/2003 | Ooiwa | |
| 6,522,043 B2 | 2/2003 | Measegi | |
| 6,559,572 B2 | 5/2003 | Nakamura | |
| 6,579,202 B2 | 6/2003 | El-Antably et al. | |
| 6,770,999 B2 | 8/2004 | Sakuraki | |
| 6,897,594 B2 | 5/2005 | Ichikawa et al. | |
| 6,903,471 B2 | 6/2005 | Arimitsu et al. | |
| 6,998,749 B2 | 2/2006 | Wada et al. | |
| 7,002,267 B2 | 2/2006 | Raszkowski et al. | |
| 7,026,733 B2 | 4/2006 | Bitsche et al. | |
| 7,239,055 B2 | 7/2007 | Burgman et al. | |
| 7,276,006 B2 | 10/2007 | Reed et al. | |
| 7,284,313 B2 | 10/2007 | Raszkowski et al. | |
| 7,322,103 B2 * | 1/2008 | Burjes et al. | 29/890.035 |
| 7,339,300 B2 | 3/2008 | Burgman et al. | |
| 7,352,091 B2 | 4/2008 | Bradfield | |
| 7,402,923 B2 | 7/2008 | Klemen et al. | |
| 7,417,344 B2 | 8/2008 | Bradfield | |
| 7,508,100 B2 | 3/2009 | Foster | |
| 7,538,457 B2 | 5/2009 | Holmes et al. | |
| 7,545,060 B2 | 6/2009 | Ward | |
| 7,592,045 B2 | 9/2009 | Smith et al. | |
| 7,615,903 B2 | 11/2009 | Holmes et al. | |
| 7,615,951 B2 | 11/2009 | Son et al. | |
| 7,667,359 B2 | 2/2010 | Lee et al. | |
| 7,939,975 B2 | 5/2011 | Saga et al. | |
| 8,067,865 B2 | 11/2011 | Savant | |
| 8,068,327 B2 | 11/2011 | Seifert et al. | |
| 2003/0222519 A1 | 12/2003 | Bostwick | |
| 2004/0036367 A1 | 2/2004 | Denton et al. | |
| 2004/0189110 A1 | 9/2004 | Ide | |
| 2004/0195929 A1 | 10/2004 | Oshidari | |
| 2005/0023266 A1 | 2/2005 | Ueno et al. | |
| 2005/0023909 A1 | 2/2005 | Cromas | |
| 2005/0194551 A1 | 9/2005 | Klaussner et al. | |
| 2005/0268464 A1 * | 12/2005 | Burjes et al. | 29/890.035 |
| 2005/0274450 A1 | 12/2005 | Smith et al. | |
| 2005/0285456 A1 | 12/2005 | Amagi et al. | |
| 2006/0170298 A1 | 8/2006 | Edrington | |
| 2007/0024130 A1 | 2/2007 | Schmidt | |
| 2007/0052313 A1 | 3/2007 | Takahashi | |
| 2007/0063607 A1 | 3/2007 | Hattori | |
| 2007/0145836 A1 | 6/2007 | Bostwick | |
| 2007/0149073 A1 | 6/2007 | Klaussner et al. | |
| 2007/0216236 A1 | 9/2007 | Ward | |
| 2008/0223557 A1 | 9/2008 | Fulton et al. | |
| 2009/0033160 A1 * | 2/2009 | Mueller | 310/58 |
| 2009/0108714 A1 * | 4/2009 | Fakes | 310/60 A |
| 2009/0121562 A1 | 5/2009 | Yim | |
| 2009/0174278 A1 | 7/2009 | Sheaffer et al. | |
| 2009/0206687 A1 | 8/2009 | Woody et al. | |
| 2010/0026111 A1 | 2/2010 | Monzel | |
| 2010/0102649 A1 | 4/2010 | Cherney et al. | |
| 2010/0109454 A1 | 5/2010 | Vadillo et al. | |
| 2010/0176668 A1 | 7/2010 | Murakami | |
| 2010/0284824 A1 | 11/2010 | Hippen et al. | |
| 2011/0050141 A1 | 3/2011 | Yeh et al. | |
| 2011/0101700 A1 | 5/2011 | Stiesdal | |
| 2011/0109095 A1 | 5/2011 | Stiesdal | |

FOREIGN PATENT DOCUMENTS

| | | |
|---|---|---|
| JP | 06-311691 A | 11/1994 |
| JP | 07-264810 A | 10/1995 |
| JP | 08-019218 A | 1/1996 |
| JP | 09-046973 A | 2/1997 |
| JP | 09-154257 A | 6/1997 |
| JP | 10-234157 A | 9/1998 |
| JP | 11-132867 A | 5/1999 |
| JP | 2000-152563 A | 5/2000 |
| JP | 2000-324757 A | 11/2000 |
| JP | 2001-333559 A | 11/2001 |
| JP | 2002-095217 A | 3/2002 |
| JP | 2002-119019 A | 4/2002 |
| JP | 2003-250247 A | 9/2003 |
| JP | 2003-299317 A | 10/2003 |
| JP | 2003-324901 A | 11/2003 |
| JP | 2004-215353 A | 7/2004 |
| JP | 2004-236376 A | 8/2004 |
| JP | 2004-297924 A | 10/2004 |
| JP | 2004-357472 A | 12/2004 |
| JP | 2005-012989 A | 1/2005 |
| JP | 2005-057957 A | 3/2005 |
| JP | 2005-168265 A | 6/2005 |
| JP | 2006-060914 A | 3/2006 |
| JP | 2000-152561 A | 9/2006 |
| JP | 2006-297541 A | 11/2006 |
| JP | 2006-528879 A | 12/2006 |
| JP | 2007-282341 A | 10/2007 |
| JP | 2008-021950 A | 2/2008 |
| JP | 2008-206213 A | 9/2008 |
| JP | 4187606 B2 | 11/2008 |
| JP | 2008-544733 A | 12/2008 |
| JP | 2009-247084 A | 10/2009 |
| JP | 2009-247085 A | 10/2009 |
| JP | 2009-254205 A | 10/2009 |
| JP | 2010-028958 A | 2/2010 |
| JP | 2010-035265 A | 2/2010 |
| JP | 2010-121701 A | 6/2010 |
| KR | 10-1997-0055103 A | 7/1997 |
| KR | 10-2006-0102496 A | 9/2006 |
| KR | 10-2007-0027809 A | 3/2007 |
| KR | 10-2009-0048028 A | 5/2009 |

OTHER PUBLICATIONS

WIPO Search Report and Written Opinion dated Oct. 29, 2012 for corresponding Application No. PCT/US2012/033915; 8 sheets.
WIPO Search Report and Written Opinion dated Nov. 14, 2012 for corresponding Application No. PCT/US2012/040794; 8 sheets.
International Search Report, mailed Jul. 31, 2012.
International Search Report completed Apr. 19, 2012.
International Search Report completed Apr. 9, 2012.
International Search Report completed Apr. 20, 2012.
International Search Report completed Mar. 8, 2012.
International Search Report completed Apr. 24, 2012.

* cited by examiner

ELECTRIC MACHINE COOLING SYSTEM AND METHOD

RELATED APPLICATIONS

This application claims priority under 35 U.S.C. §119 to U.S. Provisional Patent Application No. 61/331,221 filed on May 4, 2010, the entire contents of which is incorporated herein by reference.

BACKGROUND

Some methods for cooling an electric machine can include passing a coolant around an outer perimeter of the electric machine inside of a cooling jacket. The coolant extracts at least a portion of the heat produced by a stator, which can lead to cooling of the electric machine. For some machines, cooling can be further improved by spraying coolant from the cooling jacket directly onto end turns of the stator, which can cool the end turns. However, the coolant temperature increases as the coolant flows in a circumferential direction around the cooling jacket. As a result, the coolant is at an elevated temperature when it is sprayed onto the end turns of the stator, which can reduce the level of heat extracted from the end turns.

SUMMARY

Some embodiments of the invention provide an electric machine module including a module housing, which can at least partially define a machine cavity. In some embodiments, an electric machine can include a stator assembly and a rotor assembly and can be positioned in the machine cavity. In some embodiments, the module housing can include a coolant transport network, which can include at least one passage in fluid communication with at least one first annulus and at least one second annulus. In some embodiments, the first annulus can be located substantially axially adjacent to an axial end of the stator assembly and the second annulus can be substantially axially adjacent to an axial end of the rotor assembly. In some embodiments, one or more of the annuli can include a plurality of apertures.

Some embodiments of the invention can include an electric machine module including a module housing. In some embodiments, the module housing can include a first housing member coupled to a second housing. Also, in some embodiments, the first housing member and the second housing member can each include an annular region and an end region. In some embodiments, the module housing can include at least one coolant inlet positioned through a portion of the module housing. In some embodiments, a coolant transport network can be positioned within portions of the module housing and can be in fluid communication with the at least one coolant inlet. In some embodiments, the coolant transport network can include at least one passage positioned through a portion of each of the housing members and in fluid communication with the coolant inlet. Also, in some embodiments, the end regions of the housing members can include at least one first annulus and at least one second annulus extending axially inward from the end regions and in fluid communication with the passages.

DETAILED DESCRIPTION

Figure 1:
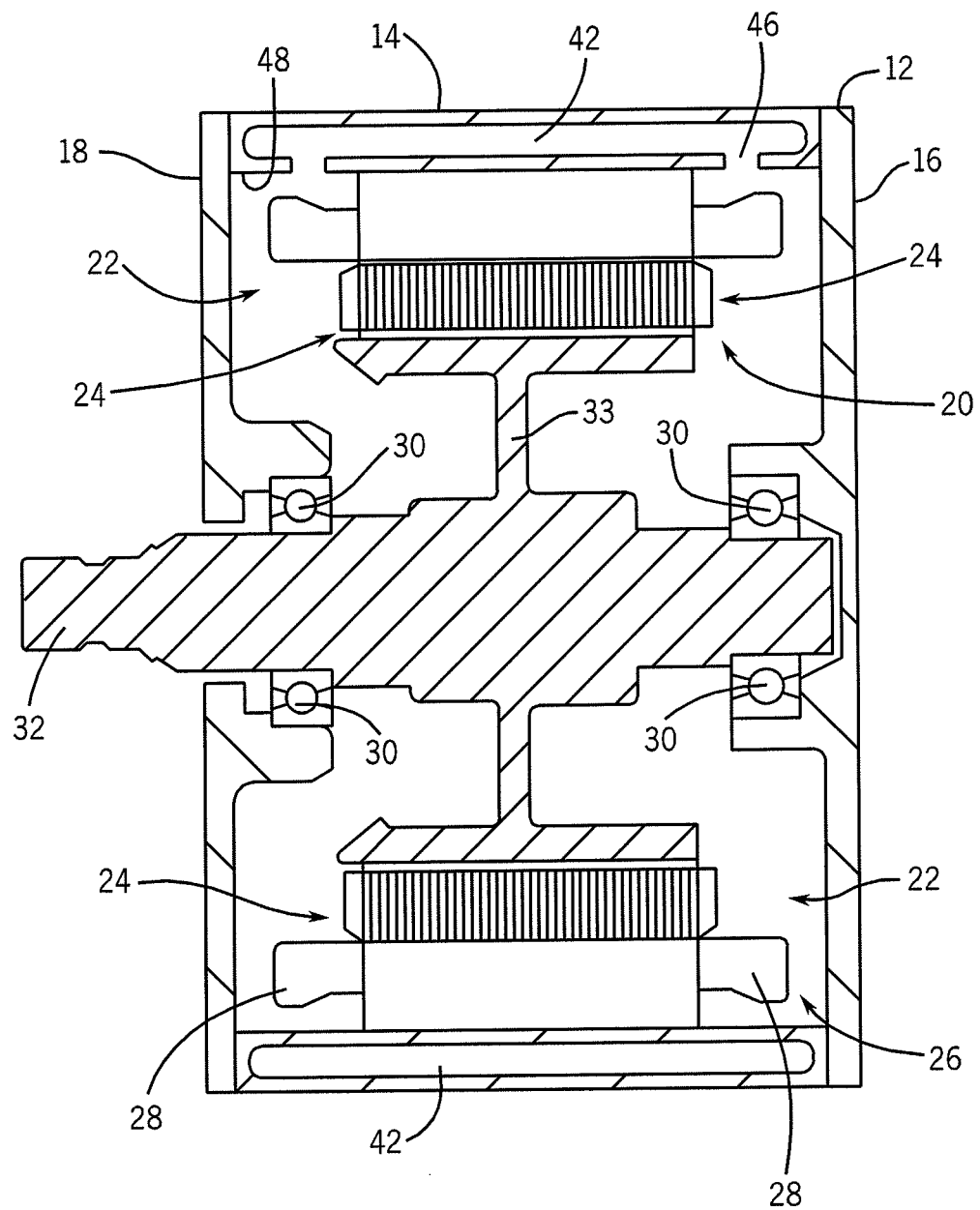
FIG. 1 is a cross-sectional view of an electric machine module according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives that fall within the scope of embodiments of the invention.

FIG. 1 illustrates an electric machine module 10 according to one embodiment of the invention. The module 10 can include a module housing 12 comprising a sleeve member 14, a first end cap 16, and a second end cap 18. An electric machine 20 can be housed within a machine cavity 22 at least partially defined by the sleeve member 14 and the end caps 16, 18. For example, the sleeve member 14 and the end caps 16, 18 can be coupled via conventional fasteners (not shown), or another suitable coupling method, to enclose at least a portion of the electric machine 20 within the machine cavity 22. In some embodiments, the sleeve member 14 can be formed so that at least one of the end caps 14, 16 is substantially integral with the sleeve member 14. In some embodiments the housing 12 can comprise a substantially cylindrical canister and a single end cap (not shown). Further, in some embodiments, the module housing 12, including the sleeve member 14 and the end caps 16, 18, can be fabricated from materials that can generally include thermally conductive properties, such as, but not limited to aluminum or other metals and materials capable of generally withstanding operating temperatures of the electric machine. In some embodiments, the housing 12 can be fabricated using different methods including casting, molding, extruding, and other similar manufacturing methods.

The electric machine 20 can be, without limitation, an electric motor, such as a hybrid electric motor, an electric generator, or a vehicle alternator. In one embodiment, the electric machine 20 can be a High Voltage Hairpin (HVH) electric motor or an interior permanent magnet electric motor for hybrid vehicle applications.

The electric machine 20 can include a rotor assembly 24, a stator assembly 26, including stator end turns 28, and bearings 30, and can be disposed about an output shaft 34. As shown in FIG. 1, the stator 26 can substantially circumscribe a portion of the rotor 24. In some embodiments, the rotor assembly 24 can also include a rotor hub 33, or can have a "hub-less" design (as shown in FIGS. 6-9).

Components of the electric machine 20 such as, but not limited to, the rotor assembly 24, the stator assembly 26, and the stator end turns 28 can generate heat during operation of the electric machine 20. These components can be cooled to increase the performance and the lifespan of the electric machine 20.

Figure 2:
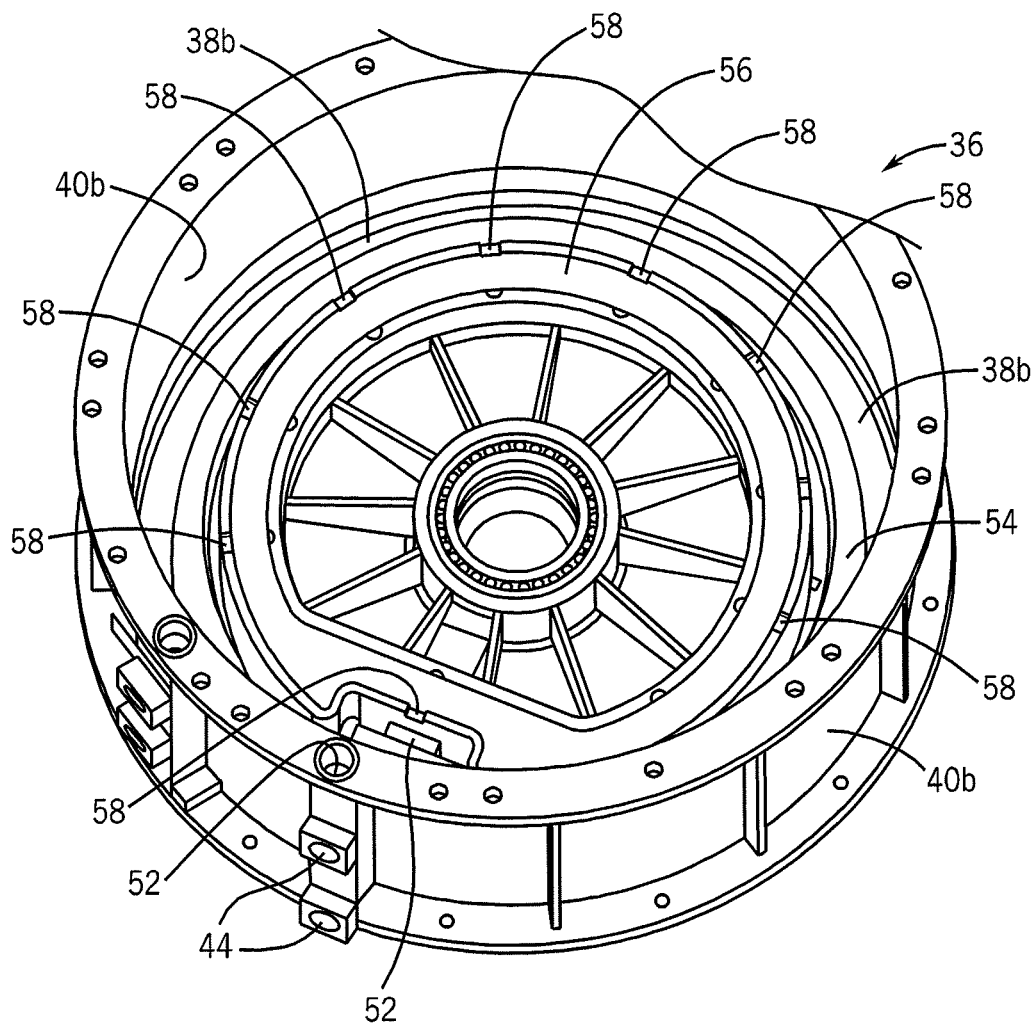
FIG. 2 is a perspective view of a housing member according to one embodiment of the invention.
Figure 3:
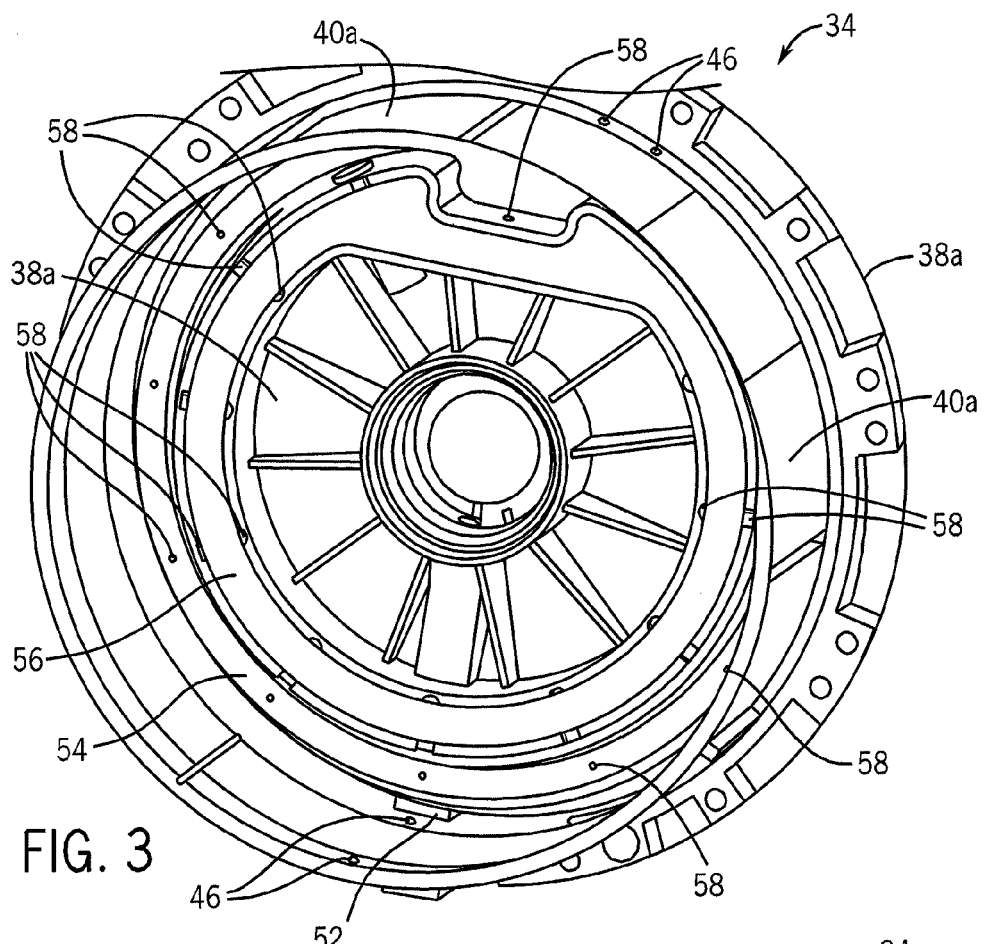
FIG. 3 is a perspective view of a housing member according to one embodiment of the invention.
Figure 4:
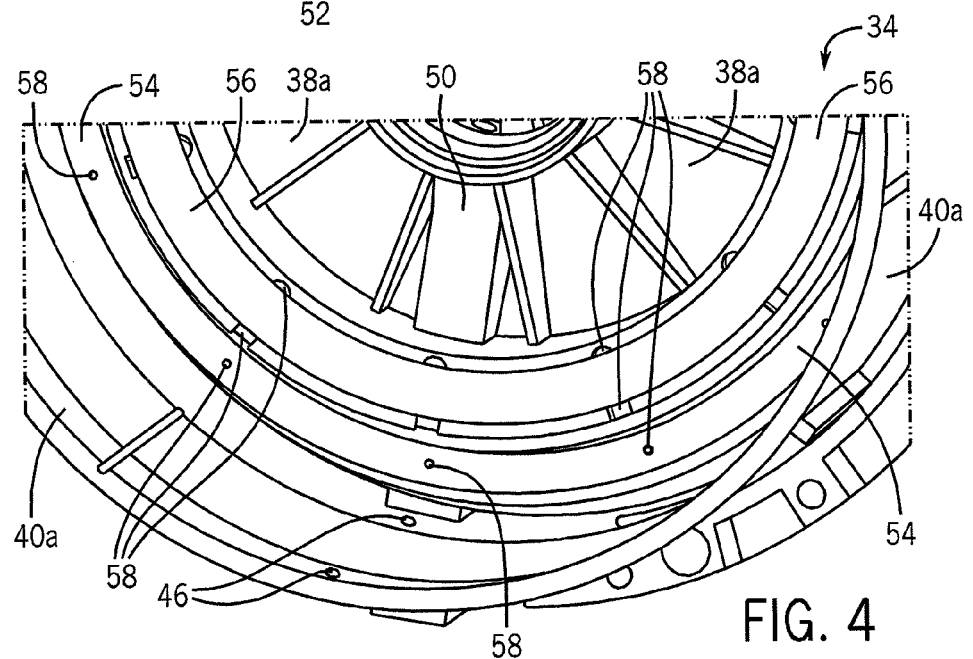
FIG. 4 is a perspective view of a portion of the housing member of FIG. 3.
Figure 5:
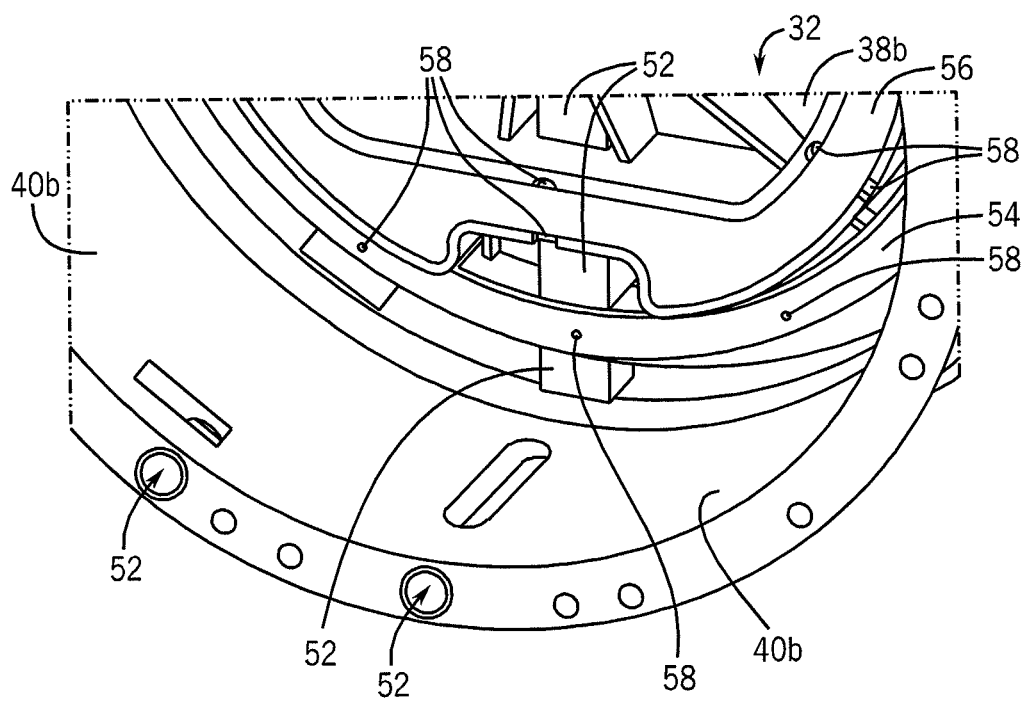
FIG. 5 is a perspective view of a portion of the housing member of FIG. 2.
Figure 6:
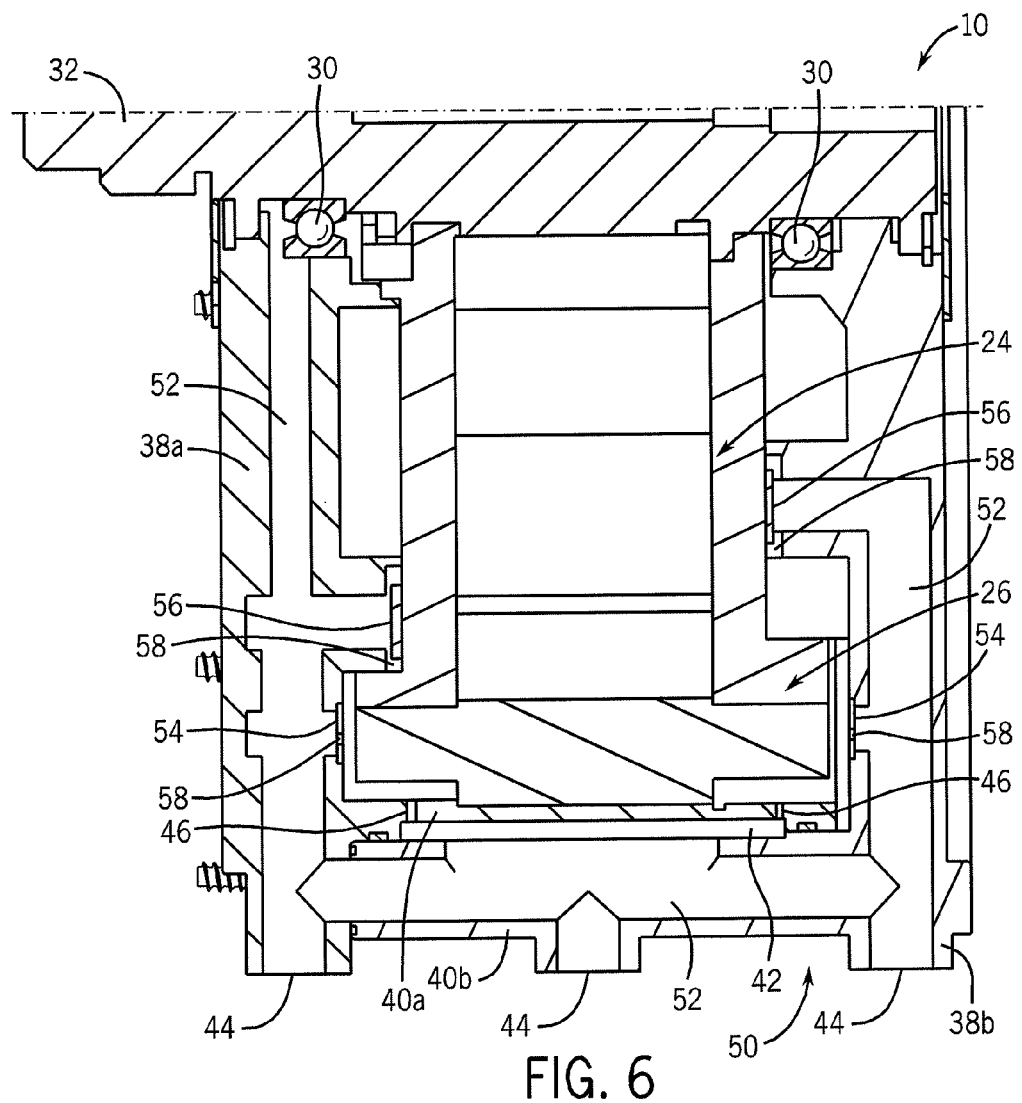
FIG. 6 is a cross-sectional view of a portion of an electric machine module according to one embodiments of the invention.
Figure 7:
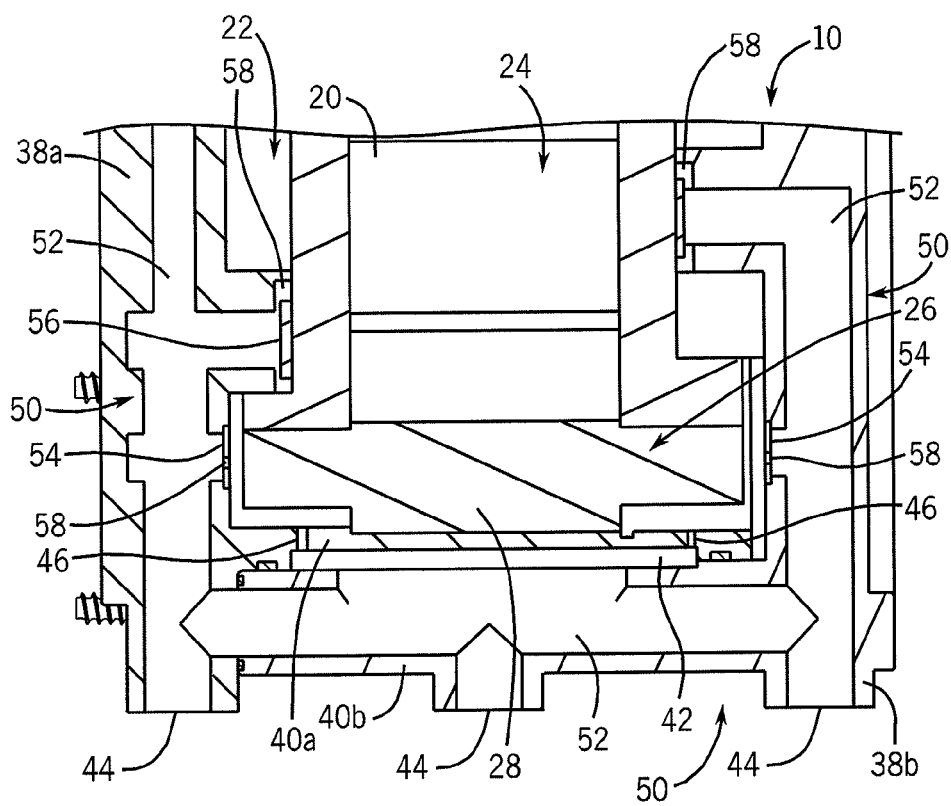
FIG. 7 is an expanded cross-sectional view of the electric machine module of FIG. 6.

Referring to FIGS. 2-9, in some embodiments, the module housing 12 can comprise different configurations. In some embodiments, the module housing 12 can comprise at least two housing members coupled together. More specifically, in some embodiments, the module housing 12 can include a first housing member 34 coupled to a second housing member 36. In some embodiments, each of the housing members 34, 36 can comprise a substantially cylindrical canister shape, including an end region 38 and an annular region 40. In some embodiments, the annular region 40a of the first housing member 34 can include a smaller outer diameter relative to an inner diameter of the annular region 40b of the second housing member 36. As a result, in some embodiments, at least a portion of the module housing 12 can be fabricated by positioning at least a portion of the annular region 40a of the first housing member 34 within the annular region 40b of the second housing member 36. For example, as shown in FIGS. 2-3, in some embodiments, the outer diameter of the annular region 40a of the first housing member 34 can be positioned so that it is immediately adjacent to the inner diameter of the annular region 40b of the second housing member 36. Moreover, in some embodiments, after positioning the housing member 34, 36 with respect to each other, the module housing 12 can be further coupled using conventional fasteners, adhesives, welding, braising, or other methods of coupling.

In some embodiments, the module housing 12 can comprise at least one coolant jacket 42. As shown in FIG. 1, in some embodiments, the sleeve member 14 can comprise the coolant jacket 42. As shown in FIGS. 6-9, in some embodiments, at least a portion of the coolant jacket 42 can be substantially formed between portions of the annular regions 40a, 40b (i.e., between portions of the outer diameter of annular region 40a and the inner diameter of annular region 40b). In some embodiments, the coolant jacket 42 can substantially circumscribe at least a portion of the electric machine 20. More specifically, in some embodiments, the coolant jacket 42 can substantially circumscribe at least a portion of an outer diameter of the stator assembly 26, including the stator end turns 28. Further, in some embodiments, the coolant jacket 42 can contain a coolant that can comprise transmission fluid, ethylene glycol, an ethylene glycol/water mixture, water, oil, motor oil, a gas, a mist, any combination thereof, or a similar substance.

In some embodiments, the module housing 12 can comprise at least one coolant inlet 44, although in other embodiments, the module housing 12 can comprise a plurality of coolant inlets 44. For example, in some embodiments, the coolant jacket 42 can be in fluid communication with a coolant source (not shown) via the coolant inlets 44, which can pressurize the coolant prior to or as it is being dispersed into the coolant jacket 42, so that the pressurized coolant can circulate through the coolant jacket 42. In some embodiments, the coolant inlets 44 can be positioned through a portion of the module housing 12 (i.e., the sleeve member 14 and/or the end caps 16, 18 or the first and/or second housing members 34, 36) in a generally lower region (i.e., relative to the output shaft 32) of the module housing 12, and can be in fluid communication with at least both of the coolant jacket 42 and the coolant source. For example, in some embodiments, the coolant inlets 44 can be positioned at a generally lowermost position (i.e., a 6 o'clock position) with respect to the output shaft 32. In other embodiments, the coolant inlets 44 can be positioned in other locations through portions of the module housing 12. Moreover, in some embodiments, the module housing 12 can comprise a plurality of coolant inlets 44 positioned at regular or irregular intervals around portions of a perimeter of the module housing 12.

Also, in some embodiments, the module housing 12 can include a plurality of coolant jacket apertures 46 so that the coolant jacket 42 can be in fluid communication with the machine cavity 22. In some embodiments, the coolant apertures 46 can be positioned substantially adjacent to the stator end turns 28. More specifically, in some embodiments, the coolant jacket apertures 46 can be positioned through portions of an inner wall 48 of the sleeve member 14. In other embodiments, the coolant jacket apertures 46 can be positioned through portions of the annular region 40a of the first housing member 34. Further, in some embodiments, the coolant jacket apertures 46 can be positioned through a generally upper portion of the module housing 12 (i.e., relative to the output shaft 32), although in other embodiments, the coolant jacket apertures 46 can be positioned at regular or irregular intervals through portions of the module housing 12 (i.e., the inner wall 48 or the annular regions 40a and/or 40b) or can be positioned in a generally lower portion of the module housing 12.

In some embodiments, as the pressurized coolant circulates through the coolant jacket 42, at least a portion of the coolant can exit the coolant jacket 42 through the coolant jacket apertures 46 and enter the machine cavity 22. Also, in some embodiments, the coolant can contact the stator end turns 28, which can lead to at least partial cooling of the stator assembly 26. After exiting the coolant jacket apertures 46, at least a portion of the coolant can flow through portions of the machine cavity 22 and can contact some module 10 elements, which, in some embodiments, can lead to at least partial cooling of the module 10. Further, in some embodiments, some portions of the coolant can circulate through the coolant jacket 42 and can receive a portion of the heat energy produced during electric machine 20 operations.

In some embodiments, the module housing 12 can comprise a coolant transport network 50. In some embodiments, the coolant transport network 50 can comprise a single passage 52. In some embodiments, the coolant transport network 50 can include a plurality of passages 52 positioned within the module housing 12. For example, in some embodiments, as shown in FIGS. 2-9, the end regions 38a and 38b of each of the housing members 34, 36 can each include passages 52. Although, in other embodiments, the sleeve member 14 and/or the end caps 16, 18 can comprise passages (not shown). Further, in some embodiments, at least one passage 52 can be positioned through a portion of the annular region 40b of the second housing member 36 and/or the annular region 40a of the first housing member 34. Moreover, in some embodiments, at least a portion of the passages 52 can be in fluid communication with at least one coolant inlet 44 so that the coolant can be introduced from the coolant source and pass into the coolant transport network 50 and the passages 52. For example, in some embodiments, as shown in FIG. 6-9, passages 52 in the first housing member 34 and the second housing member 36 can be in fluid communication with multiple coolant inlets 44.

Figure 8:
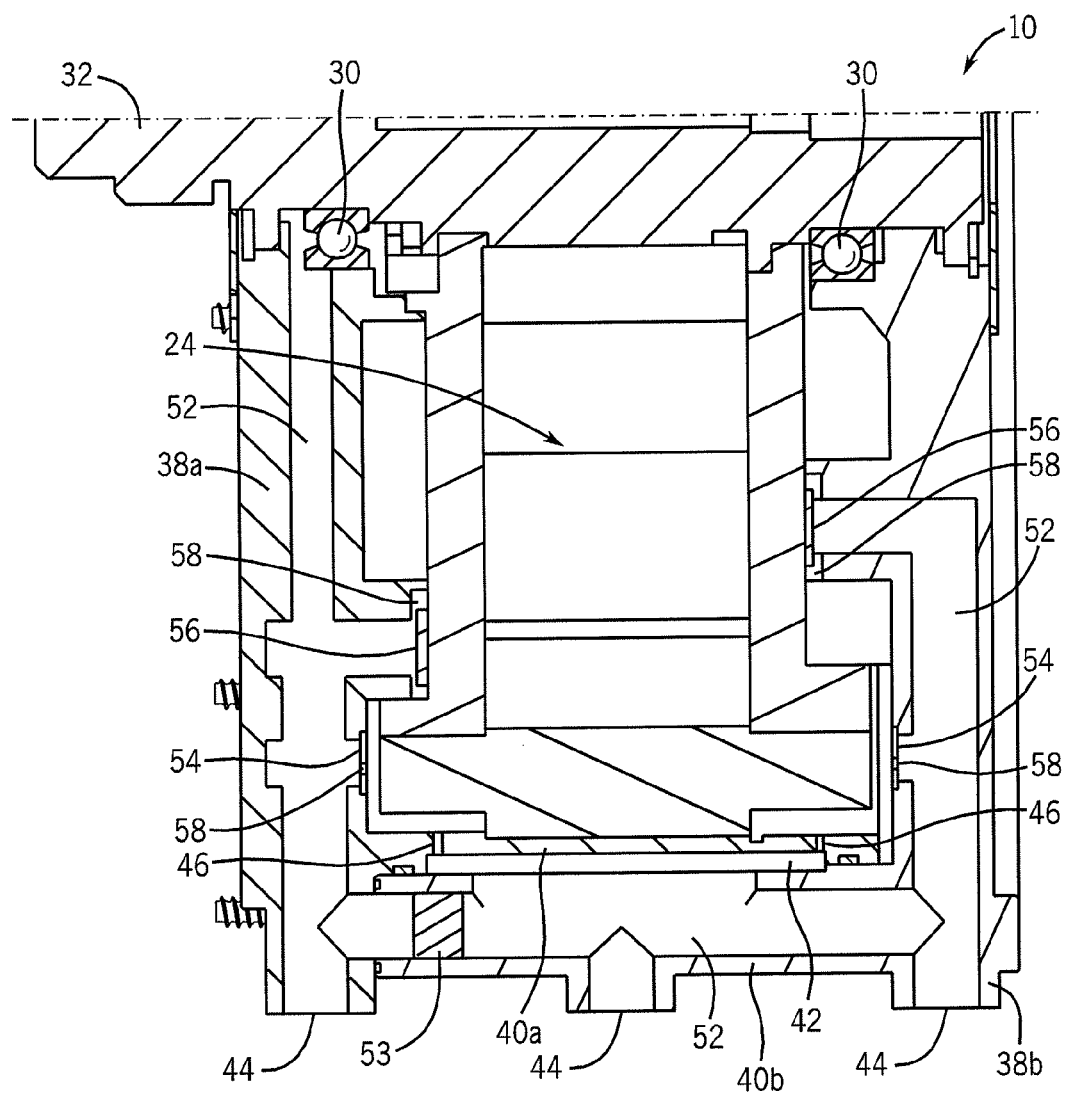
FIG. 8 is a cross-sectional view of a portion of an electric machine module according to one embodiments of the invention.
Figure 9:
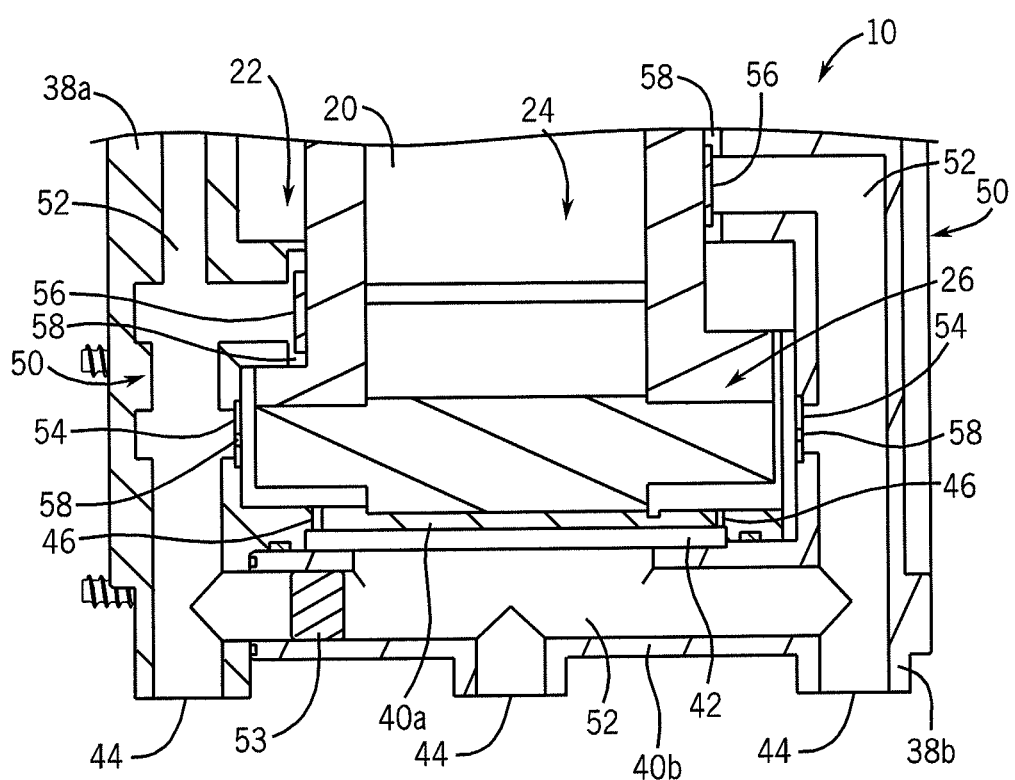
FIG. 9 is an expanded cross-sectional view of the electric machine module of FIG. 8.

In some embodiments, the coolant transport network 50 can comprise at least one plug 53. More specifically, in some embodiments, at least one plug 53 can be positioned within at least one passage 52 to prevent material amounts of coolant from flowing through the passage 52. For example, as shown in FIGS. 8-9, the plug 53 can be positioned in a passage 52 so that the passages 52 positioned in the first housing member 34 can be substantially sealed from the passages 52 positioned in the second housing member 36. As a result, at least a portion of the coolant circulating through the passages 52 of the first housing member 36 originates from a coolant inlet 44 coupled to the first housing member 34. In some embodiments, one or more plugs 53 can be positioned in the passages 52 to create a desired coolant flow route to meet user requirements.

In some embodiments, the coolant transport network 50 can further comprise a first annulus 54 and a second annulus 56. In some embodiments, each of the end regions 38a, 38b of each of the housing members 34, 36 can comprise both a first annulus 54 and a second annulus 56. In other embodiments, either end region 38a, 38b can include one of, both of, or neither of a first annulus 54 and/or a second annulus 56. More specifically, in some embodiments, the annuli 54, 56 can axially extend inward from the end regions 38a, 38b. For example, in some embodiments, the housing members 34, 46 can be formed so that the annuli 54, 56 are integral with the end regions 38a, 38b. In other embodiments, the annuli 54, 56 can be coupled to the end regions 38a, 38b using conventional coupling techniques (i.e., welding, braising, fasteners, adhesives, etc.). Further, in some embodiments, the end caps 16, 18 and/or the sleeve member 14 can comprise one of, both of, or neither of a first annulus 54 and/or a second annulus 56. In some embodiments, the first annulus 54 and the second annulus 56 can be generally concentric, as shown in FIGS. 2-9. In some embodiments, the first annulus 54 can comprise a generally larger diameter, and in other embodiments, the second annulus 56 can comprise a generally larger diameter (i.e., either the first annulus 54 or the second annulus 56 can be positioned at a more radially outward position). Although in some embodiments the annuli 54, 56 can comprise a generally circular and/or hemispherical shape, the annuli 54, 56 can comprise other shapes including, but not limited to, elliptical, square, rectangular, regular or irregular polygonal, or any combination thereof.

By way of example only, in some embodiments, the first annulus 54 can be positioned substantially axially adjacent to at least one axial side of the stator assembly 26. In some embodiments, each housing member 34, 36 can each comprise at least one first annulus 54, and, as a result, the first annuli 54 can be positioned substantially axially adjacent to both axial sides of the stator assembly 26. Further, in some embodiments, the second annulus 56 can be positioned substantially axially adjacent to at least one axial side of the rotor assembly 24. In some embodiments, each housing member 34, 36 can each comprise at least one second annulus 56, and, as a result, the second annuli 56 can be positioned substantially axially adjacent to both axial sides of the rotor assembly 24 and radially inward from the stator assembly 26. In other embodiments, the relative positions of the annuli 54, 56 can be substantially reversed (i.e., the first annulus 54 can be positioned substantially axially adjacent to the rotor assembly 24 and the second annulus 56 can be positioned substantially axially adjacent to the stator end turns 28).

As shown in FIGS. 6-9, in some embodiments, the first annulus 54 and/or the second annulus 56 can be in fluid communication with the passages 52. In some embodiments, the first annulus 54 and/or the second annulus 56 can extend axially inward from the end regions 38a, 38b, as shown in FIGS. 6-9. In some embodiments, the annuli 54, 56 can extend different distances from the end regions 38a, 38b (i.e., the first annulus 54 can extend a lesser axial distance from the passages 52 relative to the second annulus 56 or vice versa).

Further, in some embodiments, the first annulus 54 and/or the second annulus 56 can comprise a plurality of annulus apertures 58. More specifically, in some embodiments, the annulus apertures 58 can be positioned through a portion of the first annulus 54 and/or the second annulus 56 so that the annuli 54, 56 can be in fluid communication with the machine cavity 22. In some embodiments, the annulus apertures 58 can comprise a nozzle, an orifice, or other structure capable of guiding, directing, and/or urging coolant toward some elements of the module 10.

In some embodiments, the coolant can circulate from the coolant inlets 44 through the passages 52 and portions of the coolant can pass through the annuli 54, 56 and can efflux from at least some of the annulus apertures 58 toward some of the module 10 elements. In some embodiments, at least a portion of the annulus apertures 58 can be configured to direct the coolant in a generally radial direction, a generally axial direction, or a combination thereof. By way of example only, in some embodiments, the annulus apertures 58 of the first and the second annuli 54, 56 can be configured to direct coolant in a generally axially inward direction. As a result, in some embodiments, coolant can be directed toward both the rotor assembly 24 and the stator assembly 26.

Further, in some embodiments, the annulus apertures 58 can be differently configured. For example, in some embodiments, the annulus apertures 58 of the second annulus 56 can be configured to direct coolant in a generally radially outward direction and the annulus apertures 58 of the first annulus 54 can be configured to direct coolant in a generally axially direction. As a result, in some embodiments, at least a portion of the coolant exiting at least some of the annulus apertures 58 of both annuli 54, 56 can be directed toward the stator assembly 26. The annulus apertures 58 can comprise other configurations capable of directing portions of the coolant in other directions to meet user requirements.

In some embodiments, allowing the coolant spray to impact the stator assembly 26 both axially and radially can effectively "flood" portions of the stator assembly 26, including portions of the stator end turns 28, thereby increasing the amount of coolant in contact with the stator end turns 28, which can increase cooling of the stator assembly 26 and the electric machine 20. Further, in some embodiments, by allowing portions of the coolant to impact the rotor assembly 24, the coolant can receive at least a portion of the heat energy produced by the rotor assembly 24 and its components (i.e., magnets), which can further enhance electric machine 20 cooling.

In some embodiments, the coolant transport network 50 can enhance cooling relative to some electric machine modules comprising a coolant jacket alone. As shown in FIGS. 6-9, the coolant transport network 50 and the cooling jacket 42 can be in fluid communication with each other and can each receive coolant from the fluid source via at least some of the coolant inlets 44 (i.e., the coolant transport network 50 is not receiving the coolant directly from the cooling jacket 42, where such coolant can be at a higher temperature due to already receiving heat energy from the stator assembly 26). As a result, the temperature of the coolant passing through portions of the passages 52 and the annuli 54, 56 can be at a lower temperature prior to being placed into contact with the elements of the module 10, and, as a result can at least partially increase the amount of heat energy removed from the module 10. In some embodiments, the coolant transport network 50 can receive at least a portion of the coolant directly from the cooling jacket 42.

In some embodiments, at least a portion of the coolant sprayed into the machine cavity 22 can eventually flow towards a drain (not shown) in the electric machine module 10 due to gravity. The coolant at the drain can be circulated back to the fluid source (e.g., by a pump), re-cooled (either at the fluid source or at another location), and re-circulated back to the module 10.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. An electric machine module comprising:
a module housing at least partially defining a machine cavity;
an electric machine positioned in the machine cavity and at least partially enclosed by the module housing, the electric machine including a stator assembly including stator end turns and a rotor assembly, the stator assembly circumscribing at least a portion of the rotor assembly; and
the module housing including a coolant transport network, the coolant transport network including:
at least one passage in fluid communication with at least one first annulus and at least one second annulus, wherein the at least one first annulus is substantially axially adjacent to an axial end of the stator assembly and the at least one second annulus is substantially axially adjacent to an axial end of the rotor assembly, and
each of the at least one first annulus and the at least one second annulus comprising a plurality of annulus apertures so that the at least one first annulus and the at least one second annulus are in fluid communication with the machine cavity.

2. The electric machine module of claim 1 and further comprising a coolant jacket positioned through a portion of the module housing, the coolant jacket circumscribing at least a portion of the stator assembly.

3. The electric machine module of claim 2 and further comprising a plurality of coolant jacket apertures positioned through a portion of the module housing so that the coolant jacket is in fluid communication with the machine cavity.

4. The electric machine module of claim 1, wherein at least a portion of the plurality of annulus apertures comprise at least one of a nozzle and an orifice.

5. The electric machine module of claim 1, wherein the plurality of annulus apertures are configured and arranged to direct a coolant in at least one of a radial direction and an axial direction.

6. The electric machine module of claim 1, wherein the module housing comprises a sleeve member coupled to two end caps, the sleeve member and the two end caps each include at least a portion of the coolant transport work; and
wherein each of the two end caps include at least one first annulus and at least one second annulus, the sleeve member includes a coolant jacket circumscribing at least a portion of the stator assembly, and an inner wall of the sleeve member includes a plurality of coolant jacket apertures so that the coolant jacket is in fluid communication with the machine cavity.

7. The electric machine module of claim 1, wherein the module housing comprises at least two housing members coupled together, each of the housing members includes an end region and an annular region, and each of the housing members includes a portion of the coolant transport network; and
wherein the end region of each of the housing members includes at least one first annulus and at least one second annulus and the two housing members are coupled together so that a coolant jacket is formed substantially between at least a portion of the annular regions of the two housing members.

8. The electric machine module of claim 1 wherein the module housing comprises at least two first annuli and at least two second annuli.

9. The electric machine module of claim 8 wherein the two first annuli are positioned substantially axially adjacent to both axial ends of the stator assembly and the two second annuli are positioned substantially axially adjacent to both axial ends of the rotor assembly.

10. An electric machine module comprising:
a module housing including a first housing member coupled to a second housing member, a machine cavity defined by portions of the first housing member and the second housing member, and the first housing member and the second housing member each including an annular region and an end region;
at least one coolant inlet positioned through a portion of the module housing; and
a coolant transport network positioned within portions of each of the first housing member and the second housing member and in fluid communication with the at least one coolant inlet, the coolant transport network including:
at least one passage positioned through a portion of each of the first housing member and the second housing member and in fluid communication with the at least one coolant inlet, and
the end regions of the first housing member and the second housing member comprising at least one first annulus and at least one second annulus extending axially inward from the end regions, the at least one first annulus and the at least one second annulus of the first housing member are in fluid communication with the at least one passage of the first housing member, and the at least one first annulus and the at least one second annulus of the second housing member are in fluid communication with the at least one passage of the second housing member.

11. The electric machine module of claim 10, wherein each of the at least one first annulus and the at least one second annulus of the first housing member and each of the at least one first annulus and the at least one second annulus of the second housing member comprise a plurality of annulus apertures.

12. The electric machine module of claim 11, wherein at least a portion of the plurality of annulus apertures comprise at least one of a nozzle and an orifice.

13. The electric machine module of claim 11, wherein the plurality of annulus apertures are configured and arranged to direct a coolant in at least one of a radial direction and an axial direction.

14. The electric machine module of claim 10 and further comprising a coolant jacket defined between a portion of the annular region of the first housing member and a portion of the annular region of the second housing member.

15. The electric machine module of claim 10 and further comprising an electric machine positioned within the machine cavity and at least partially enclosed by the module housing, the electric machine including a stator assembly and a rotor assembly;
wherein each of the at least one first annuli of the first housing member and the second housing member are substantially axially adjacent to the stator assembly; and
wherein each of the at least one second annuli of the first housing member and the second housing member are substantially axially adjacent to the rotor assembly.

16. The electric machine module of claim 10 wherein each of the first housing member and the second housing member comprise at least one coolant inlet.

17. The electric machine module of claim 16 and further comprising at least one plug positioned in the coolant transport network so that the at least one first annulus and the at least one second annulus of the first housing member are substantially sealed from the at least one coolant inlet of the second housing member.

18. The electric machine module of claim 10, wherein the at least one first annulus and the at least one second annulus of the first housing member and the second housing member are concentric.

19. A method of cooling an electric machine module, the method comprising:
providing a module housing at least partially defining a machine cavity, the module housing including at least one passage, at least one first annulus, and at least one second annulus, the at least one passage in fluid communication with the at least one first annulus and the at least one second annulus;
positioning an electric machine substantially within the machine cavity so that the electric machine is at least partially enclosed by the module housing, the electric machine including a stator assembly and a rotor assembly;
positioning the at least one first annulus substantially axially adjacent to the stator assembly; and
positioning the at least one second annulus substantially axially adjacent to the rotor assembly.

20. The method of claim 19 wherein the at least one first annulus and the at least one second annulus each comprise a plurality of annulus apertures.

\* \* \* \* \*